United States Patent
Becker et al.

(10) Patent No.: US 10,698,100 B2
(45) Date of Patent: Jun. 30, 2020

(54) METHOD AND DEVICE FOR DETERMINING THE POSITION OF A VEHICLE

(71) Applicant: Robert Bosch GmbH, Stuttgart (DE)

(72) Inventors: Jan Becker, Palo Alto, CA (US); Oliver Pink, Ditzingen (DE); Soeren Kammel, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 15/576,447

(22) PCT Filed: May 10, 2016

(86) PCT No.: PCT/EP2016/060428
§ 371 (c)(1),
(2) Date: Nov. 22, 2017

(87) PCT Pub. No.: WO2016/192934
PCT Pub. Date: Dec. 8, 2016

(65) Prior Publication Data
US 2018/0149739 A1    May 31, 2018

(30) Foreign Application Priority Data
Jun. 1, 2015    (DE) .................. 10 2015 210 015

(51) Int. Cl.
*G01S 1/00*      (2006.01)
*G01S 13/86*    (2006.01)
(Continued)

(52) U.S. Cl.
CPC .............. *G01S 13/86* (2013.01); *G01S 13/89* (2013.01); *G01S 13/931* (2013.01); *G01S 19/40* (2013.01);
(Continued)

(58) Field of Classification Search
USPC .................................................. 701/400–533
See application file for complete search history.

(56) References Cited

U.S. PATENT DOCUMENTS

| 5,485,385 A * | 1/1996 | Mitsugi | G01C 17/38 |
|---|---|---|---|
| | | | 701/472 |
| 7,746,271 B2 * | 6/2010 | Furstenberg | G01S 1/026 |
| | | | 342/357.23 |

(Continued)

FOREIGN PATENT DOCUMENTS

| DE | 102006058303 A1 | 6/2008 |
|---|---|---|
| JP | H07134735 A | 5/1995 |

(Continued)

OTHER PUBLICATIONS

International Search Report dated Jul. 15, 2016, of the corresponding International Application PCT/EP2016/060428 filed May 10, 2016.

*Primary Examiner* — Jonathan L Sample
(74) *Attorney, Agent, or Firm* — Norton Rose Fulbright US LLP; Gerard Messina

(57) ABSTRACT

A method for determining the position of a vehicle, including: determination of a GNS vehicle position by a GNS unit, sensor acquisition of a surrounding environment of the GNS vehicle position by a radar sensor unit of the vehicle in order to ascertain radar data corresponding to the acquired surrounding environment, detection of objects situated in the surrounding environment based on the radar data, ascertaining of a direction vector that points from a detected object to a reference point fixed to the vehicle, comparison of the radar data and the ascertained direction vector to a digital map that has objects and direction vectors assigned to the objects, the direction vectors assigned to the objects pointing to a position in the digital map from which the corresponding object was acquired by a radar sensor unit, and ascer- (Continued)

taining of a corrected vehicle position based on the GNS vehicle position and the comparison.

8 Claims, 4 Drawing Sheets

(51) Int. Cl.
  *G01S 19/40* (2010.01)
  *G01S 13/931* (2020.01)
  *G01S 13/89* (2006.01)

(52) U.S. Cl.
  CPC . *G01S 2013/932* (2020.01); *G01S 2013/9316* (2020.01); *G01S 2013/9322* (2020.01)

(56) References Cited

U.S. PATENT DOCUMENTS

| | | | | |
|---|---|---|---|---|
| 8,612,135 | B1* | 12/2013 | Montemerlo | G01C 21/30 701/400 |
| 9,037,404 | B2* | 5/2015 | Ibrahim | B60W 30/12 701/446 |
| 9,043,072 | B1* | 5/2015 | Tisdale | G05D 1/021 701/28 |
| 9,062,979 | B1* | 6/2015 | Ferguson | G01C 21/30 |
| 9,201,424 | B1* | 12/2015 | Ogale | G06T 7/80 |
| 9,719,801 | B1* | 8/2017 | Ferguson | G01C 25/00 |
| 2003/0109980 | A1* | 6/2003 | Kojima | B60W 50/038 701/96 |
| 2007/0027612 | A1* | 2/2007 | Barfoot | G05D 1/0297 701/117 |
| 2007/0219720 | A1* | 9/2007 | Trepagnier | B60W 30/095 701/300 |
| 2011/0054716 | A1* | 3/2011 | Stahlin | G01C 21/28 701/1 |
| 2012/0221244 | A1* | 8/2012 | Georgy | G01C 21/165 701/472 |
| 2012/0271540 | A1* | 10/2012 | Miksa | G01S 13/865 701/409 |
| 2013/0103298 | A1* | 4/2013 | Becker | G01S 13/86 701/300 |
| 2014/0307247 | A1* | 10/2014 | Zhu | G01S 17/931 356/4.01 |
| 2014/0309920 | A1* | 10/2014 | Ricci | G01C 21/26 701/400 |
| 2014/0372026 | A1* | 12/2014 | Georgy | G01S 19/47 701/469 |
| 2015/0073705 | A1* | 3/2015 | Hiwatashi | G01S 19/48 701/468 |
| 2016/0357187 | A1* | 12/2016 | Ansari | G01S 13/89 |

FOREIGN PATENT DOCUMENTS

| | | |
|---|---|---|
| JP | H10300493 A | 11/1998 |
| JP | H1194943 A | 4/1999 |
| JP | H11249552 A | 9/1999 |
| JP | 2007102357 A | 4/2007 |
| JP | 2009264983 A | 11/2009 |
| JP | 2010160777 A | 7/2010 |
| JP | 2013025401 A | 2/2013 |
| SE | 528298 C2 | 10/2006 |

* cited by examiner

METHOD AND DEVICE FOR DETERMINING THE POSITION OF A VEHICLE

FIELD

The present invention relates to a method and to a device for determining the position of a vehicle. The present invention also relates to a method and a device for creating a digital map. The present invention also relates to a computer program.

BACKGROUND INFORMATION

U.S. Patent Pub. No. 2013/0103298 A1 describes a method for determining a position of a vehicle.

SUMMARY

In accordance with the present invention, an improved method and an improved device are provided for determining the position of a vehicle.

An object of the present invention includes providing a method and a device for creating a digital map.

An object of the present invention also includes providing a computer program for the above-described tasks, namely an improved determination of position and/or the creation of a digital map.

Advantageous example embodiments of the present invention are described herein.

According to an aspect of the present invention, an example method is provided for determining a position of a vehicle, the method including the following steps:
 determining a GNS vehicle position using a GNS unit,
 sensor acquisition of a surrounding environment of the GNS vehicle position using a radar sensor unit of the vehicle, in order to ascertain radar data corresponding to the acquired surrounding environment,
 detection of objects situated in the surrounding environment, based on the radar data,
 ascertaining a direction vector that points from a detected object to the radar sensor unit or to some other reference point fixed to the vehicle,
 comparing the radar data and the ascertained direction vector with a digital map that has objects and direction vectors assigned to the objects, the direction vectors assigned to the objects pointing to a position in the digital map from which the corresponding object was acquired by a radar sensor unit,
 ascertaining a corrected vehicle position based on the GNS vehicle position and the comparison.

According to a further aspect, a device is provided for determining a position, including:
 a GNS unit for determining a GNS vehicle position,
 a radar sensor unit for the sensor acquisition of a surrounding environment of the GNS vehicle position, in order to ascertain radar data corresponding to the acquired surrounding environment,
 a processor that is fashioned to detect objects situated in the surrounding environment based on the radar data and to ascertain a direction vector that points from a detected object to the radar sensor unit or to some other reference point fixed to the vehicle,
 the processor in addition being fashioned to compare the radar data and the ascertained direction vector with a digital map that has objects and direction vectors assigned to the objects, the direction vectors assigned to the objects pointing to a position in the digital map from which the corresponding object was acquired by a radar sensor unit,
 the processor in addition being fashioned to ascertain a corrected vehicle position based on the GNS vehicle position and the comparison.

According to another aspect, a method is provided for creating a digital map, including the following steps:
 determining a GNS vehicle position of a vehicle using a GNS unit,
 sensor acquisition of a surrounding environment of the GNS vehicle position by a radar sensor unit of the vehicle, in order to ascertain radar data corresponding to the acquired surrounding environment,
 detection of objects situated in the surrounding environment based on the radar data,
 ascertaining a respective direction vector that points from a detected object to the GNS vehicle position,
 creation of the digital map based on the radar data and the ascertained direction vectors, so that the digital map includes detected objects and direction vectors assigned to the objects.

According to a further aspect, a device is provided for creating a digital map, including:
 a GNS unit for determining a GNS vehicle position of a vehicle,
 a radar sensor unit for sensor acquisition of a surrounding environment of the GNS vehicle position, in order to ascertain radar data corresponding to the acquired surrounding environment, and
 a processor that is fashioned to detect objects situated in the surrounding environment based on the radar data, and
 ascertaining a respective direction vector that points from a detected object to the GNS vehicle position,
 the processor in addition being fashioned to create the digital map based on the radar data and be ascertained direction vectors, so that the digital map includes detected objects and direction vectors assigned to the objects.

According to a further aspect, a computer program is provided that includes program code for carrying out the method for determining the position of a vehicle and/or for creating a digital map when the computer program is executed on a computer.

The present invention thus includes using, in order to determine the position of the vehicle, another direction vector that points from a detected object to the radar sensor unit or to some other reference point fixed to the vehicle (the radar sensor unit is a reference point fixed to the vehicle, but in general other reference points fixed to the vehicle can also be provided), by comparing this direction vector to direction vectors of a digital map, the direction vectors of the digital map being assigned to objects of the digital map, and these direction vectors pointing to a respective position in the digital map from which the corresponding object was acquired by a radar sensor during the creation of the map. If ascertained direction vectors agree with direction vectors of the digital map, then generally it can be assumed that the associated objects detected by the radar sensor unit are the same objects in the digital map. In this way, a precise determination of the position of the vehicle within the digital map is enabled. This is particularly advantageous because a determination of position solely using a GNS unit is very susceptible to imprecision. Such possible imprecision can advantageously be corrected or compensated according to the present invention using the direction vectors. US 2013/0103298 A1, cited above, does not describe such direction vectors.

The direction vectors thus provide in particular angular information. Such angular information corresponds for example to an angle between the direction vector and a longitudinal axis of the vehicle.

In accordance with the present invention, this angular information is additionally incorporated into the digital map during the creation of the digital map. That is, for the detected objects the direction is also indicated from the position or location at which the detected objects were detected by the radar sensor unit. This is because the GNS vehicle position corresponds to the location of the radar measurement using the radar sensor unit, at least within the limit of measurement precision. When there is a determination of position based on such a digital map, such a direction vector, or a plurality of such direction vectors, is then likewise determined for the detected objects. The more the ascertained direction vectors agree with the direction vectors of the digital map, the higher the probability is that the objects detected during the determination of the position of the vehicle are the objects in the digital map. A matching between the radar image, which is based on the radar data and was ascertained during the determination of the position of the vehicle, and the digital map, which is also based on radar data, is thus simplified.

The abbreviation GNS stands for Global Navigation System, and is to be understood as a placeholder for a global position determination system, for example based on runtime measurements of a plurality of satellites. That is, for example a GPS, Galileo, or GLONASS unit can also be provided as GNS unit. GNS stands for Global Navigation System, and also includes radio location via ground stations, and, in the variant of GNSS (Global Navigation Satellite System), includes GPS, Galileo, and preferably other solutions as well.

In a specific embodiment, it is provided that, based on the radar data and/or further sensor information, it is ascertained which detected objects are stationary and which detected objects are mobile objects, and the mobile objects are ignored during the comparison. This step holds equally for the method for determining position and for the method for creating a digital map. The idea here is to distinguish between stationary and mobile objects. The mobile objects are ignored. Preferably, the mobile objects are removed from the corresponding radar data and/or further sensor data. Thus, the digital map then for example only includes stationary objects. This means in particular that the radar image that was ascertained during the determination of the position of the vehicle then only includes stationary objects. This is because a digital map that also included mobile objects would certainly no longer be precise, because, due to their mobility, the mobile objects could move away from their original position. A matching between the digital map and the radar image ascertained during the determination of position of the vehicle would in this way unnecessarily be made more difficult.

Such further sensor data are provided for example by an environmental sensor system that can for example include one or more of the following environmental sensors: ultrasound sensor, lidar sensor, video sensor.

That is, according to a specific embodiment, in addition to the radar data further sensor data can also be used for the determination of position.

In order to distinguish whether the detected objects are stationary or mobile objects, according to a specific embodiment it is provided that the detected objects are assigned a speed by a radar measurement. Thus, preferably a respective speed of the detected objects is determined or measured. In this way, a distinction between mobile and stationary objects can advantageously be made.

According to a specific embodiment, a speed threshold value is provided above which a detected object is classified as a mobile object and below which a detected object is classified as a stationary object. The provision of such a threshold value can advantageously compensate or take into account possible measurement imprecision in the radar measurement.

In a specific embodiment, it is provided that the comparison includes a fitting of the radar data to the digital map. An adaptation or a regression or a compensation calculation is thus advantageously carried out. That is, in particular the radar data ascertained during the determination of position are brought into agreement with the radar data of the digital map.

Here, the greatest possible degree of agreement is brought about.

According to a specific embodiment, it is provided that the fitting is carried out using an iterative closest point algorithm and/or a particle-based algorithm. Through the provision of these algorithms, an efficient compensation calculation or an efficient fitting can advantageously be brought about.

According to a specific embodiment, the radar sensor unit has a detection range or acquisition range of from 100 m to 250 m, and/or a detection field of view or an acquisition field of view of from 30° to 70°.

Functionalities of the method result analogously from the functionalities of the corresponding devices, and vice versa. That is, method features result from the device features, and vice versa.

Below, the present invention is explained in more detail on the basis of preferred exemplary embodiments.

DETAILED DESCRIPTION OF EXAMPLE EMBODIMENTS

Figure 1:
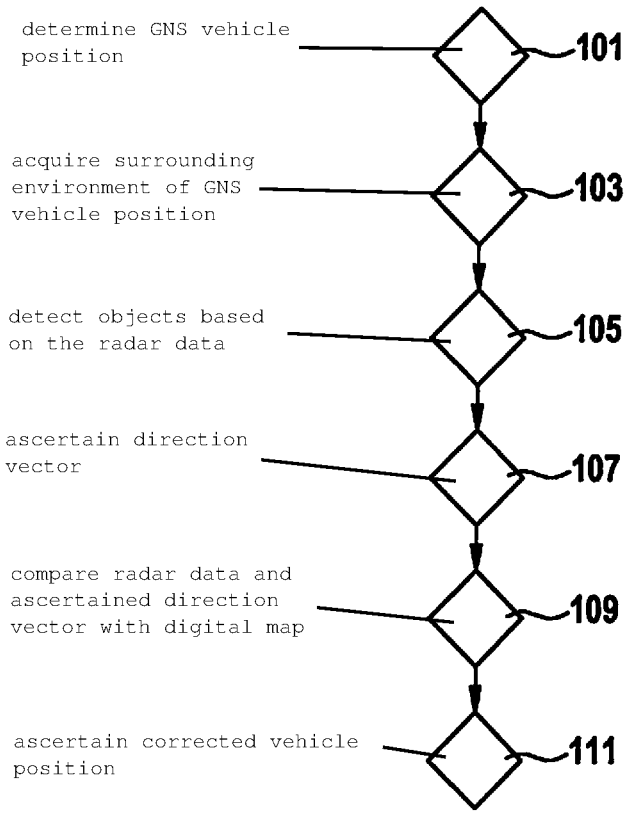
FIG. 1 shows a flow diagram of a method for determining the position of a vehicle.

FIG. 1 shows a flow diagram of a method for determining the position of a vehicle.

In a step 101, a GNS vehicle position is determined using a GNS unit. In a step 103, a surrounding environment of the GNS vehicle position is acquired by sensors, using a radar sensor unit of the vehicle, in order to ascertain radar data corresponding to the acquired environment. That is, in particular a radar image of the surrounding environment of the GNS vehicle position is ascertained. In the sense of the present invention, a radar sensor unit includes in particular one or more radar sensors.

In the sense of the present invention, a GNS unit includes in particular one or more GNS sensors.

In a step 105, based on the radar data, objects are detected that are situated in the surrounding environment of the GNS vehicle position. That is, in particular the radar data are correspondingly further processed in order to detect objects in the surrounding environment of the GNS vehicle position, based on the radar data.

In a step 107, a direction vector is ascertained that points from a detected object to the radar sensor unit or to some other reference point fixed to the vehicle. In particular, given a plurality of detected objects, a respective direction vector is ascertained for each object. The direction vector is in particular GNS-independent during the determination of position.

In a step 109, the radar data and the ascertained direction vector (or vectors) are compared with a digital map. The digital map includes objects and direction vectors assigned to the objects, the direction vectors assigned to the objects pointing to a position in the digital map from which the corresponding object was acquired by a radar sensor unit. The map was created for example using the method for creating a digital map.

In a step 111 it is then provided that a corrected vehicle position is ascertained based on the GNS vehicle position and the comparison.

In the comparison according to step 109, it is for example provided to fit the ascertained radar data, with the ascertained direction vectors, to the digital map. In particular, in step 109, in the course of the comparison it is provided that the ascertained direction vectors are compared with the direction vectors of the digital map. In particular, here it is provided that a measure is ascertained for a degree of agreement of the direction vectors with one another. Such a measure is a probability value for this agreement, or can for example be used as a basis for a probability calculation concerning the extent to which the objects detected during the determination of the position of the vehicle are the objects in the digital map.

Figure 2:
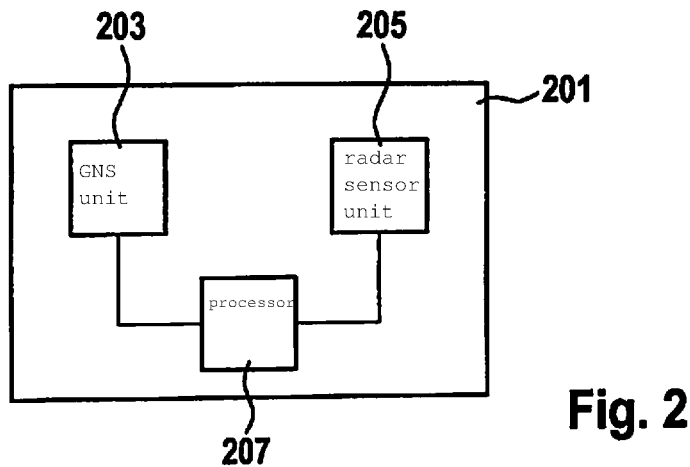
FIG. 2 shows a device for determining the position of a vehicle.

FIG. 2 shows a device 201 for determining the position of a vehicle. Device 201 includes:
  a GNS unit 203 for determining a GNS vehicle position,
  a radar sensor unit 205 for the sensor acquisition of a surrounding environment of the GNS vehicle position in order to ascertain radar data corresponding to the acquired surrounding environment,
  a processor 207 that is fashioned to detect objects situated in the surrounding environment based on the radar data and
  to ascertain a direction vector that points from a detected object to a reference point fixed to the vehicle,
  the processor 207 in addition being fashioned to compare the radar data and the ascertained direction vector to a digital map that includes objects and direction vectors assigned to the objects, the direction vectors assigned to the objects pointing to a position in the digital map from which the corresponding object was acquired by a radar sensor unit 205,
  the processor 207 in addition being fashioned to ascertain a corrected vehicle position based on the GNS vehicle position and the comparison.

According to a specific embodiment, device 201 is fashioned to carry out or execute the method shown in FIG. 1.

Figure 3:
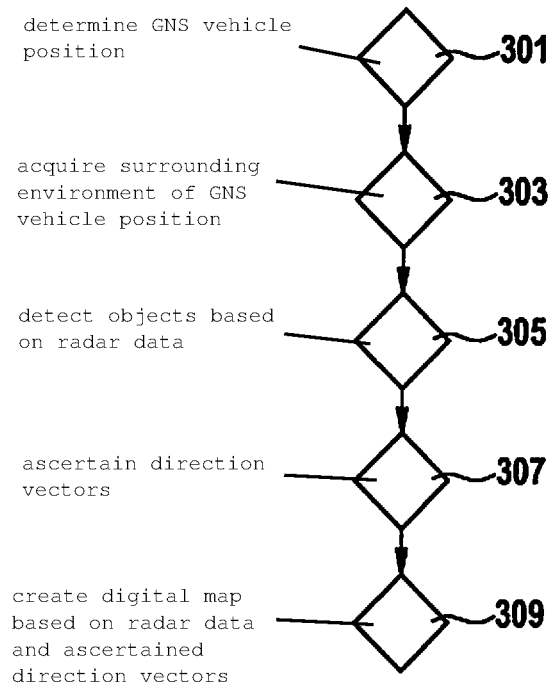
FIG. 3 shows a flow diagram of a method for creating a digital map.

FIG. 3 shows a flow diagram of a method for creating a digital map.

In a step 301, a GNS vehicle position of a vehicle is determined using a GNS unit. In a step 303, a surrounding environment of the GNS vehicle position is acquired by a radar sensor unit of the vehicle in order to ascertain radar data corresponding to the acquired surrounding environment. In a step 305, objects are detected that are situated in the surrounding environment of the GNS vehicle position. This is done based on the radar data. In a step 307, it is provided that a respective direction vector is ascertained that points from a detected object to the GNS vehicle position. According to a step 309, it is then provided that the digital map is created based on the radar data and the ascertained direction vectors, so that the digital map includes detected objects and direction vectors assigned to the objects.

In this way, a digital map is advantageously provided that includes both the information about the detected objects and also the information concerning from which position or from which location within the digital map the detected object or objects were acquired by the radar sensor unit. That is, in particular, a direction vector points from the detected object to the associated measurement position.

Figure 4:
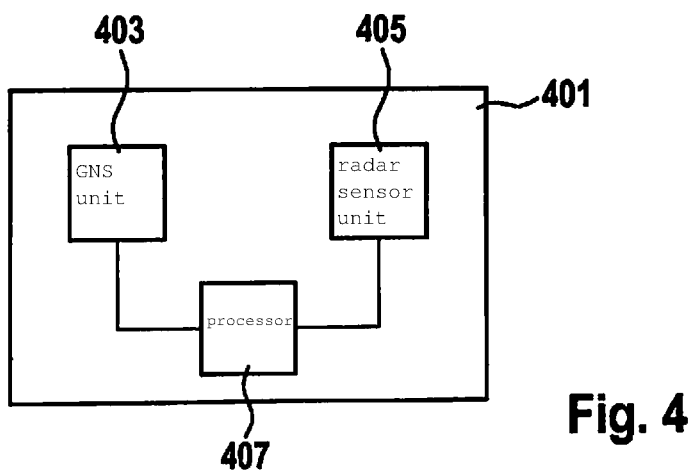
FIG. 4 shows a device for creating a digital map.

FIG. 4 shows a device 401 for creating a digital map. Device 401 includes:
  a GNS unit 403 for determining a GNS vehicle position of a vehicle,
  a radar sensor unit 405 for the sensor acquisition of a surrounding environment of the GNS vehicle position in order to ascertain radar data corresponding to the acquired surrounding environment, and
  a processor 407 that is fashioned to detect objects situated in the surrounding environment based on the radar data and
  to ascertain a respective direction vector that points from a detected object to the GNS vehicle position,
  the processor 407 in addition being fashioned to create the digital map based on the radar data and the ascertained direction vectors, so that the digital map includes detected objects and direction vectors assigned to the objects.

According to a specific embodiment, it is provided that the device 401 is fashioned to execute or carry out the method for creating a digital map.

Figure 5:
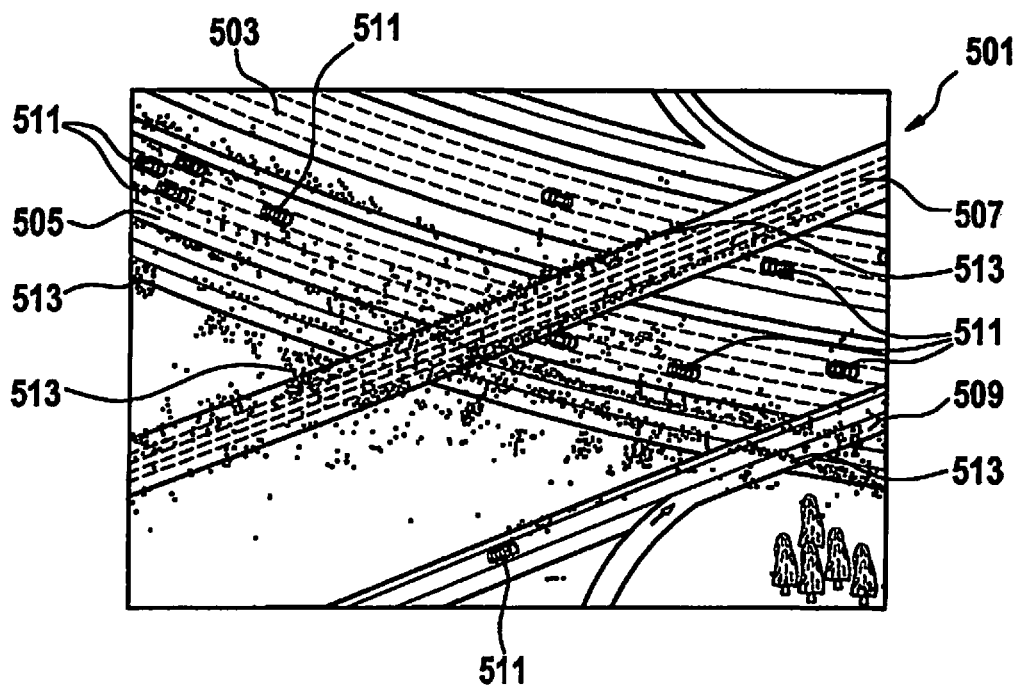
FIGS. 5-7 each show a street scene on which a radar image is superimposed.
Figure 6:
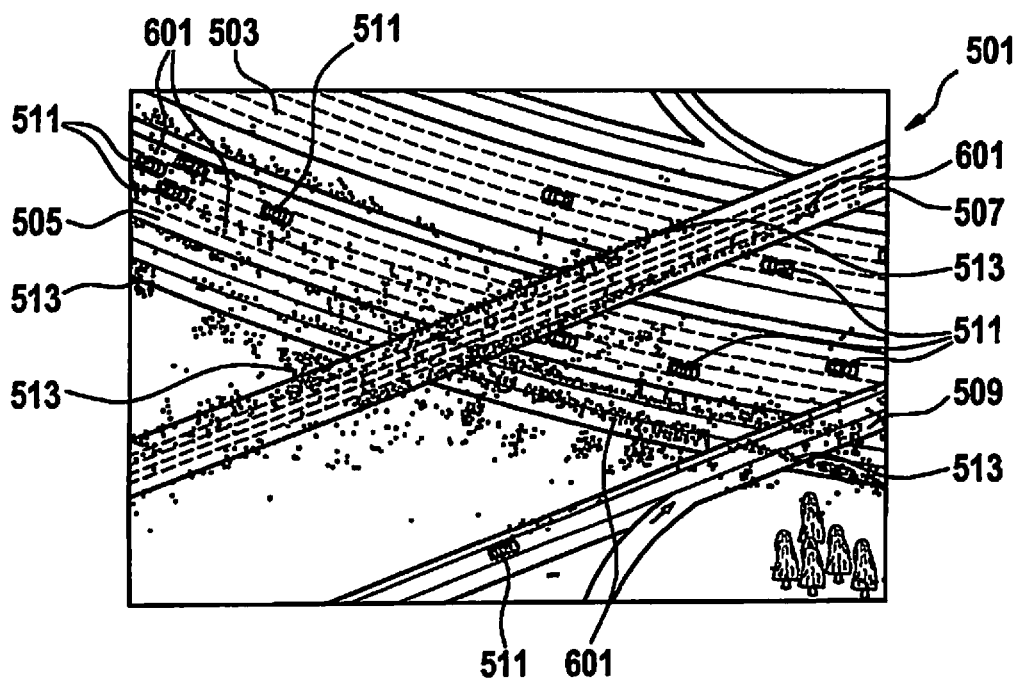
Figure 7:
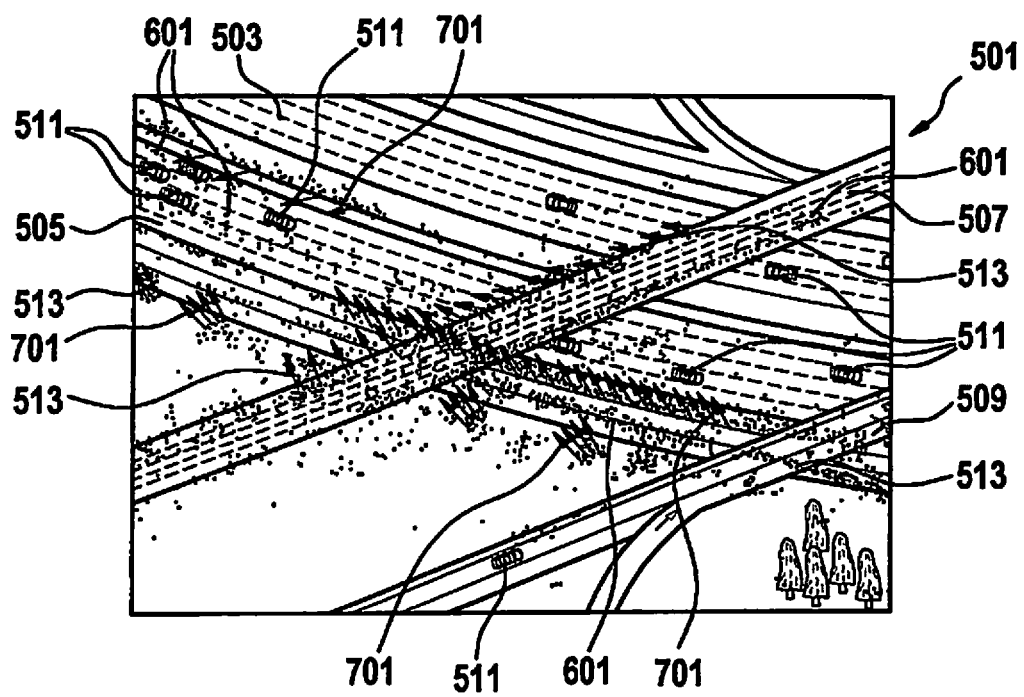

FIGS. 5 through 7 each show a street scene on which a radar image acquired by a radar sensor unit of the vehicle has been superimposed.

As an example, reference character 501 indicates a street scene on which a radar image was superimposed, including a plurality of streets 503, 505, as well as two bridges 507, 509 having streets. Reference character 511 indicates vehicles that are driving on streets 503, 505 or on bridges 507, 509.

Reference character 513 indicates depicted radar locations at which a vehicle has detected an object using its radar sensor unit. A radar location thus designates a location at which the radar sensor unit detects an object. Here, based on the radar measurement it can be the case that a plurality of radar locations corresponds to one physical object. Thus, for example bridges, due to their length, include a plurality of such radar locations. These objects 513 can for example correspond to bridges 507, 509, i.e. stationary objects. Depicted radar locations 513 can for example also correspond to vehicles 511, i.e. mobile objects.

FIG. 6 shows street scene 501 with depicted radar locations 513 according to FIG. 5, as well as radar locations originating from the digital map. The latter radar locations are here provided with reference character 601.

FIG. 7 shows, in addition to FIG. 6, arrows provided with reference character 701. These arrows 701 are direction vectors that point from depicted radar locations to an associated measurement point, i.e. to the location of the radar measurement.

The present invention is a substantial improvement over U.S. Patent App. Pub. No. 2013/0103298 A1, in that it also takes into consideration angular information (the direction vectors). It improves the precision and reliability of the approaches, while maintaining the advantages, which are for example that standardly series-production radar sensors and standard GNS sensors can be used, which can reduce costs.

The present invention advantageously improves the precision of the location estimation compared to standard GNS-based systems. The typical precision that can be achieved with the procedure according to the present invention is a precise location having a degree of precision of less than a driving lane, i.e. sub-lane precision. This means that the system can at least precisely determine the current lane of the vehicle.

In densely occupied urban environments, precision and reliability are not worsened by multiple reflections, as is the case for GNS-based location. The precision and reliability on the basis of the direction vectors according to the present invention are also not limited by changing light conditions, as is the case for sight-based location systems.

The example system according to the present invention requires only one (or more) automobile radar sensors (in addition to a GNS system), which are already available in an increasing number of new factory vehicles. The advantage of the example systems can be achieved through only software. That is, it is advantageous that no additional hardware is required, so that no additional hardware costs arise.

The following features of specific embodiments can for example be provided individually or in combination.

Mapping (Creation of the Digital Map):

1. Driving

According to a specific embodiment, a digital map of the surrounding environment is created. A vehicle equipped with automobile radar sensors and GNS maps the streets during driving.

2. Scanning of Radar Targets (Detection of Objects)

The radar sensor unit (preferably including one or more radar sensors) records the position of radar echoes relative to the sensor and the radial current speed of radar measurements in its field of view; see FIG. 5. These positions are recorded together with the current GNS position of the vehicle. The radar sensor unit thus provides radar data, i.e. a radar image, corresponding to the surrounding environment of the vehicle. The individual positions of the radar echoes are preferably recorded as radar locations.

3. Distinguishing Between Dynamic and Stationary Obstacles or Objects

In this step, for example a distinction is made between stationary positions above ground level and dynamic positions. Stationary positions can be signs, parked vehicles, fence posts, barriers, and other immobile metallic surfaces that are commonly found alongside roadways. Dynamic positions can for example be other vehicles in motion. Preferably, the inherent motion of the home vehicle, which can be obtained by the on-board odometry, the steering wheel angle, the inertial sensor system, etc., is combined with the observed relative speed of other vehicles, so that advantageously an estimation of the movement of these obstacles relative to the stationary frame of the roadway map is possible. Positions having absolute speeds that are below a specified threshold value (for example 3 mph) are classified as stationary. All other positions are classified as dynamic.

4. Parked Vehicles

Because the stationary infrastructure is generally of greatest relevance, according to a specific embodiment positions at objects having the shape of an automobile, or other potentially movable objects, are marked as such in the radar data or in the radar image (potentially movable or self-moving).

5. Cartography

All stationary positions or objects are inputted into a geographically coded database that can also be referred to as a map of radar positions. In particular, positions of the non-moving, stationary infrastructure are incorporated into the map. Positions classified as dynamic or potentially self-moving should not be incorporated into the map.

The novel aspect of the present invention, to which key significance is to be attributed, is the incorporation into the map of the angular direction from which the position at the object was acquired. The direction is derived from the angle from which the object was measured; see FIG. 7.

Location or determination of the position of the vehicle

1. GNS Location

The GNS system or the GNS unit determines a rough estimation of its own position via GNS.

2. Scanning of Radar Positions

The radar sensor unit records the relative position and the radial momentary speed of the radar measurements within the field of view during travel. This measurement implicitly includes the direction from which the position is acquired.

3. Processing for Online Location

All non-stationary (moving) positions are ignored. The stationary radar measurements are then adapted to the previously recorded map, an adaptation algorithm, e.g. iterative closest point algorithm, or a particle-based procedure being used.

The angular information (direction vectors), i.e. the direction from which the radar position is seen in the measurement, is compared to the angular information stored in the map. The closer the directions are to one another, the higher the probability is that this is the same object.

In conclusion, in particular a method is for determining the position of a vehicle by acquiring an approximate position using a GNS unit, the position being made more precise through comparison of online sensor measurements from a radar sensor with previously stored sensor measurements from a database or digital map, the direction from which the measurements were carried out being used explicitly for the determination of the position.

What is claimed is:

1. A method for determining the position of a vehicle, the method comprising:

determining a GNS vehicle position by a GNS unit;

acquiring a surrounding environment of the GNS vehicle position by a radar sensor unit of the vehicle to ascertain radar data corresponding to the acquired surrounding environment;

detecting objects situated in the surrounding environment based on the radar data;

ascertaining, for each of the detected objects, a respective direction vector that points from the detected object to a reference point fixed to the vehicle;

comparing the radar data and the ascertained direction vectors to a digital map that has objects and direction vectors assigned to the objects, the direction vectors assigned to the objects pointing to a position in the digital map from which the corresponding object was acquired by a radar sensor unit; and ascertaining a corrected vehicle position based on the GNS vehicle position and the comparison;

wherein the direction vector includes the angular direction from which the position at the object was acquired, and
wherein the comparison includes a fitting of the radar data to the digital map, and wherein the fitting is carried out using at least one of an iterative closest point algorithm and a particle-based fit algorithm.

2. The method as recited in claim 1, further comprising:
ascertaining, based on the radar data, which detected objects are stationary objects and which detected objects are mobile objects, the mobile objects being ignored in the comparison.

3. The method as recited in claim 1, wherein the fitting is carried out using iterative closest point algorithm.

4. The method as recited in claim 1, wherein the fitting is carried out using the particle-based fit algorithm.

5. A device for determining the position of a vehicle, comprising:
a GNS unit for determining a GNS vehicle position;
a radar sensor unit for sensor acquisition of a surrounding environment of the GNS vehicle position to ascertain radar data corresponding to the acquired surrounding environment;
a processor to detect objects situated in the surrounding environment based on the radar data and to ascertain, for each of the detected objects, a respective direction vector that points from the detected object to a reference point fixed to the vehicle, wherein the processor is configured to compare the radar data and the ascertained direction vectors with a digital map that has objects and direction vectors assigned to the objects, the direction vectors assigned to the objects pointing to a position in the digital map from which the corresponding object was acquired by a radar sensor unit, and wherein the processor is configured to ascertain a corrected vehicle position based on the GNS vehicle position and the comparison;
wherein the direction vector includes an angular direction from which the position at the object was acquired, and
wherein the comparing includes a fitting of the radar data to the digital map, and wherein the fitting is carried out using at least one of an iterative closest point algorithm and a particle-based fit algorithm.

6. A method for creating a digital map, comprising:
determining a GNS vehicle position of a vehicle using a GNS unit;
acquiring a surrounding environment of the GNS vehicle position by a radar sensor unit of the vehicle to ascertain radar data corresponding to the acquired surrounding environment;
detecting objects situated in the surrounding environment based on the radar data;
ascertaining, for each of the detected objects, a respective direction vector that points from the detected object to the GNS vehicle position; and
creating the digital map based on the radar data and the ascertained direction vectors, so that the digital map includes detected objects and direction vectors assigned to the objects;
wherein the direction vector includes an angular direction from which the position at the object was acquired.

7. A device for creating a digital map, comprising:
a GNS unit for determining a GNS position of a vehicle;
a radar sensor unit for the sensor acquisition of a surrounding environment of the GNS vehicle position to ascertain radar data corresponding to the acquired surrounding environment; and
a processor that is fashioned to detect objects situated in the surrounding environment based on the radar data, and to ascertain, for each of the detected objects, a respective direction vector that points from the detected object to the GNS vehicle position, the processor further being fashioned to create the digital map based on the radar data and the ascertained direction vectors, so that the digital map includes detected objects and direction vectors assigned to the objects;
wherein the direction vector includes an angular direction from which the position at the object was acquired.

8. A non-transitory computer readable storage medium on which is stored a computer program, which is executable by a processor, comprising:
a program code arrangement including program code for determining the position of a vehicle, by performing the following:
determining a GNS vehicle position by a GNS unit;
acquiring a surrounding environment of the GNS vehicle position by a radar sensor unit of the vehicle to ascertain radar data corresponding to the acquired surrounding environment;
detecting objects situated in the surrounding environment based on the radar data;
ascertaining, for each of the detected objects, a respective direction vector that points from the detected object to a reference point fixed to the vehicle;
comparing the radar data and the ascertained direction vectors to a digital map that has objects and direction vectors assigned to the objects, the direction vectors assigned to the objects pointing to a position in the digital map from which the corresponding object was acquired by a radar sensor unit; and
ascertaining a corrected vehicle position based on the GNS vehicle position and the comparison;
wherein the direction vector includes an angular direction from which the position at the object was acquired, and
wherein the comparing includes a fitting of the radar data to the digital map, and wherein the fitting is carried out using at least one of an iterative closest point algorithm and a particle-based fit algorithm.

* * * * *